(12) United States Patent
Hamburg

(10) Patent No.: US 12,166,878 B2
(45) Date of Patent: Dec. 10, 2024

(54) SYSTEM AND METHOD TO IMPROVE EFFICIENCY IN MULTIPLICATION_LADDER-BASED CRYPTOGRAPHIC OPERATIONS

(71) Applicant: CRYPTOGRAPHY RESEARCH, INC., San Jose, CA (US)

(72) Inventor: Michael Alexander Hamburg, Laguna Beach, CA (US)

(73) Assignee: Cryptography Research, Inc., San Jose, CA (US)

( * ) Notice: Subject to any disclaimer, the term of this patent is extended or adjusted under 35 U.S.C. 154(b) by 169 days.

(21) Appl. No.: 17/916,979

(22) PCT Filed: Apr. 14, 2021

(86) PCT No.: PCT/US2021/027223
§ 371 (c)(1),
(2) Date: Oct. 4, 2022

(87) PCT Pub. No.: WO2021/211678
PCT Pub. Date: Oct. 21, 2021

(65) Prior Publication Data
US 2023/0254145 A1 Aug. 10, 2023

Related U.S. Application Data

(60) Provisional application No. 62/705,082, filed on Jun. 10, 2020, provisional application No. 63/009,644, filed on Apr. 14, 2020.

(51) Int. Cl.
*H04L 9/30* (2006.01)
(52) U.S. Cl.
CPC .................. *H04L 9/3066* (2013.01)

(58) Field of Classification Search
CPC .................. H04L 9/3066; H04L 9/30
See application file for complete search history.

(56) References Cited

U.S. PATENT DOCUMENTS

| 2005/0195973 | A1 | 9/2005 | Ibrahim |
| 2008/0049931 | A1* | 2/2008 | Vasyltsov ............. H04L 9/3066 380/28 |

(Continued)

OTHER PUBLICATIONS

Notification of Transmittal of the International Search Report and the Written Opinion of the International Searching Authority, or the Declaration with Mail Date Jul. 7, 2021 re: Int'l Appln. No. PCT/US2021/027223. 15 pages.

*Primary Examiner* — Quazi Farooqui
(74) *Attorney, Agent, or Firm* — LOWENSTEIN SANDLER LLP

(57) ABSTRACT

Aspects of the present disclosure involve a method to perform a cryptographic operation using a plurality of iterations, each of the plurality of iterations comprising: loading a first number corresponding to a difference between a first component of a first input working point on an elliptic curve and a first component of a second input working point on the elliptic curve, loading a second number corresponding to a difference between the first component of the first input working point and a first component of a third input working point on the elliptic curve, and determining a third number corresponding to a difference between a first component of a first output working point on the elliptic curve and the first component of the second input working point, wherein determining the third number comprises squaring a product of the first number and a first function of the second number.

26 Claims, 6 Drawing Sheets

(56) References Cited

U.S. PATENT DOCUMENTS

| | | |
|---|---|---|
| 2016/0087802 A1 | 3/2016 | Peeters |
| 2018/0336015 A1 | 11/2018 | Roetteler et al. |
| 2019/0044732 A1* | 2/2019 | Reinders ............... H04L 9/3073 |

* cited by examiner

SYSTEM AND METHOD TO IMPROVE EFFICIENCY IN MULTIPLICATION_LADDER-BASED CRYPTOGRAPHIC OPERATIONS

TECHNICAL FIELD

The disclosure pertains to cryptographic computing applications, more specifically to improving efficiency of cryptographic operations.

BRIEF DESCRIPTION OF THE DRAWINGS

The present disclosure will be understood more fully from the detailed description given below and from the accompanying drawings of various implementations of the disclosure.

FIG. 1A depicts one step of a Montgomery ladder.

FIG. 1B illustrates a geometric interpretation of the step of the Montgomery ladder depicted in FIG. 1A.

DETAILED DESCRIPTION

Figure 1:
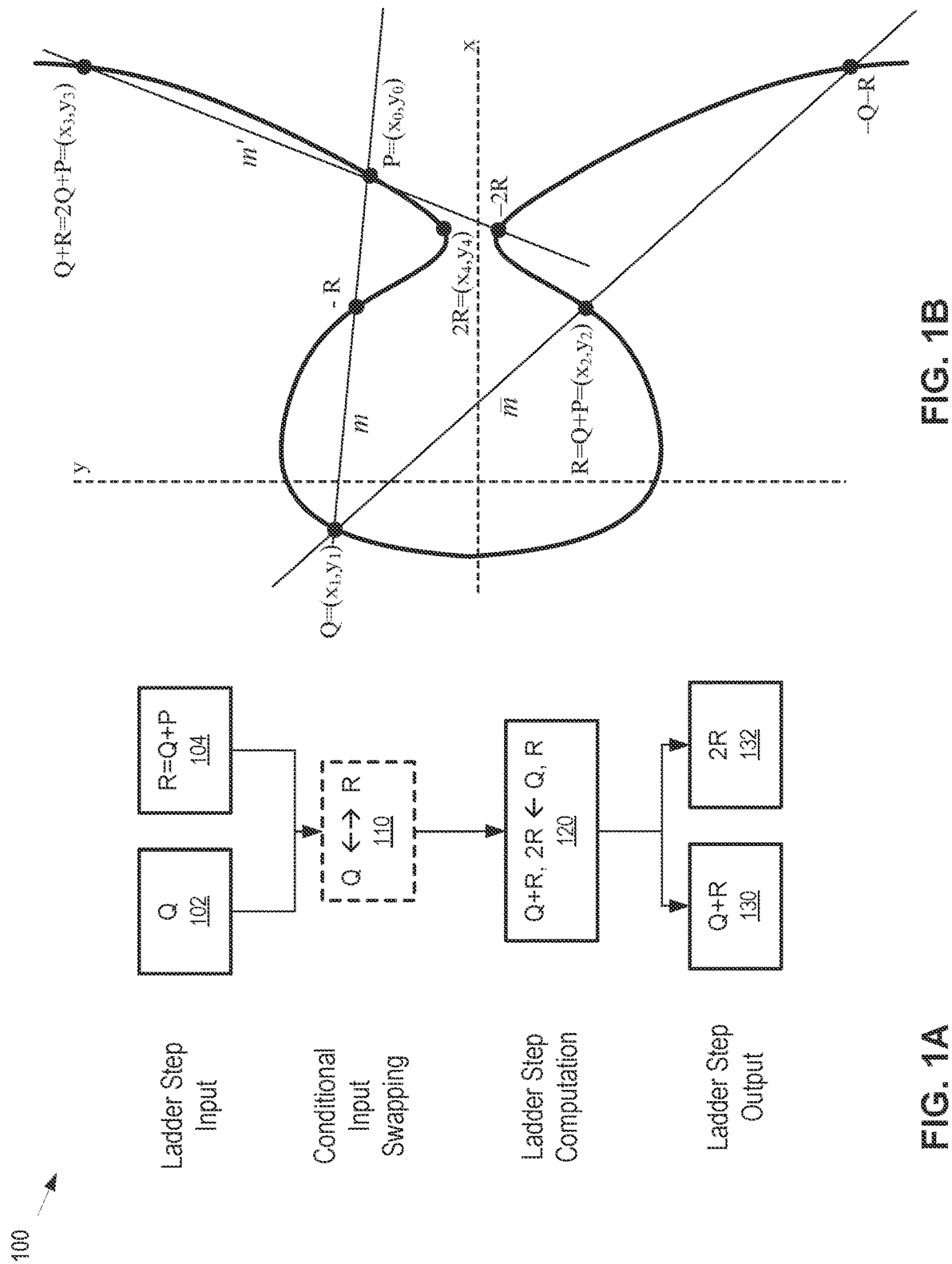
FIG. 1 illustrate an exemplary improved method of performing processor- and memory-efficient elliptic curve-based cryptographic operations, in accordance with implementations of the present disclosure.

Aspects of the present disclosure are directed to improving speed of ladder-based cryptographic operations using processor- and memory-efficient ladder multiplication.

In public-key cryptography systems, a processing device may have various components/modules used for cryptographic operations on input messages. Input messages used in such operations are often large binary numbers whose processing is often performed on low-bit microprocessors, such as smart card readers, wireless sensor nodes, and so on. Cryptographic algorithms often involve modular arithmetic operations with modulus N, in which the set of all integers Z is wrapped around a circle of length N (the set $Z_N$), so that any two numbers that differ by N (or any other integer of N) are treated as the same number.

Many cryptographic applications employ elliptic curve multiplication, which may involve operations with points (x,y) on an elliptic curve. For example, an elliptic curve $f(x,y)=0$ may be a Weierstrass curve where $f(x,y)$ is a third degree polynomial in x and a second degree polynomial in y, defining a curve, $y^2 \; x^3+ax+b$. A cryptographic operation on such elliptic curve may involve selecting a base point P (which may be a public key) and multiplying P by an integer number k (which may be a private key): Q=kP. The elliptic curve multiplication may be defined via a set of specific rules for point doubling (2A), point addition (A+B), zero (infinity) point, and so on. The strength of the elliptic curve cryptography is rooted in the fact that for large values of k, the resulting point Q can be practically anywhere on the elliptic curve. As a result, the inverse operation to determine an unknown value of the private key k from a known value Q (referred to as the discrete logarithm of Q to base P: $k=\log_P Q$), can be a prohibitively difficult computational operation.

To avoid implementing the multiplication Q=kP via k loop iterations, a variety of ladder-type algorithms may be used, which require a significantly reduced number of loop iterations (generally, about $\log_2 k$ iterations). For example, in a computing device executing the Montgomery ladder algorithm, a memory device (having multiple registers or memory components) may be used to store the accumulator value A and an auxiliary value B, with one doubling and one addition operation performed at each iteration. Prior to the first iteration, the accumulator value may be set to zero, A←0, and the auxiliary value B may be set to P: B←P. In each iteration j, starting from the most significant non-zero bit, the Montgomery ladder algorithm adds the auxiliary value B to the accumulator value and doubles the auxiliary value B, provided that the accumulator value A of the respective key bit is set, $k_j=1$. If the key bit is zero, $k_j=0$, the algorithm adds the accumulator value A to the auxiliary value B and doubles the accumulator value A:

A←A+B, B←2B, if $k_j=1$;
A←2A, B←A+B, if $k_j=0$.

After the final iteration, the algorithm returns the accumulator value A as the result of the multiplication Q=kP.

For example, if the key (e.g., the cryptographic key) is k=41, represented with six bits, k=(101001), the multiplication Q=kP may give rise to six iterations (steps) summarized in the following table.

TABLE 1

Illustration of the Montgomery ladder

| Input: | k | A←0 | B←P |
|---|---|---|---|
| | 1 | Add: 0 + P = P | Double: 2P |
| | | A←P | B←2P |
| | 0 | Double: 2P | Add: P + 2P = 3P |
| | | A←2P | B←3P |
| | 1 | Add: 2P + 3P = 5P | Double: 6P |
| | | A←5P | B←6P |
| | 0 | Double: 10P | Add: 5P + 6P = 11P |
| | | A←10P | B←11P |
| | 0 | Double: 20P | Add: 10P + 11P = 21P |
| | | A←20P | B←21P |
| | 1 | Add: 20P + 21P = 41P | Double: 42P |
| | | A←41P | B←42P |
| Output: | | Read result from A: | |
| | | Q←41P | |

As another example, in the Joye Double-Add ladder algorithm, the iterations may be performed in the reverse order, from right to left, starting from the least significant bit. If the key bit is set, $k_j=1$, the double-and-add operation is performed on the value A, but if the key bit is clear, $k_j=0$, the double-and-add operation is performed on the value B:

A←2A+B, B←B, if $k_j=1$;
A←A, B←2B+A, if $k_j=0$.

After the final iteration, the algorithm returns the accumulator value A, which represents the result of the multiplication Q=kP. For the example of k=42, represented with six bits, k=(101010), the multiplication Q=kP using the Joye Double-Add algorithm gives rise to following six steps (to be performed from the bottom up):

TABLE 2

Illustration of the Joye Double-Add ladder

| Output: | | Read result from A:<br>Q←42P | |
|---|---|---|---|
| | 1 | Double &Add: 20P + 22P<br>A←42P | No change:<br>B←22P |
| | 0 | No change:<br>A←10P | Double & Add: 12P + 10P<br>B←22P |
| | 1 | Double & Add: 4P + 6P<br>A←10P | No change:<br>B←6P |
| | 0 | No change:<br>A←2P | Double & Add: 4P + 2P<br>B←6P |
| | 1 | Double & Add: 0 + 2P<br>A←2P | No change:<br>B←2P |
| | 0 | No change:<br>A←0 | Double & Add: 2P + 0 = 2P<br>B←2P |
| Input: | k | A←0 | B←P |

Because in the elliptic curve cryptography doubling and adding are performed on special geometric curves with specially defined operations, each step in the Montgomery and/or Joye Double-Add ladder may involve a number of multiplication, squaring, and addition operations. FIG. 1 illustrates an exemplary improved method of performing processor- and memory-efficient elliptic curve-based cryptographic operations, in accordance with implementations of the present disclosure. FIG. 1A depicts one step 100 of a Montgomery ladder. The depicted ladder step may involve an input having two or more objects (each represented by multiple components, e.g., large numbers modulo N), such as Q (object 102) and R (object 104) which may differ by a base object P: R=Q+P. The input objects may correspond to points on a Weierstrass curve, such as $y^2 x^3+ax+b$, within an (x, y) plane: Q=($x_1$, $y_1$), R=($x_2$, $y_2$), wherein P=R−Q=($x_0$, $y_0$). Three points add up to zero if they lie on a straight line, e.g., points Q, P, and −R add up to zero: Q+P−R=0. Two points have opposite signs if they are symmetric with respect to the x-axis, e.g., −R=($x_2$, −$y_2$). A doubling operation (e.g., 2R) is defined as a limit where two addends coincide and is thus associated with the tangent line drawn through the argument of the doubling operation (e.g., point R).

According to the standard formulas for short Weierstrass elliptic curve operations, a sum R of points Q and P has the x-coordinate $x_2=m^2-x_1-x_0$, where m is the slope of the line connecting points Q, P, and −R, as depicted schematically in FIG. 1B, which illustrates a geometric interpretation of the step of the Montgomery ladder depicted in FIG. 1A. Accordingly, the y-coordinate of R is $-y_2=y_1+m(x_2-x_0)$. The points Q and R serve as an input into the ladder step computation 120. A conditional input swapping 110 may be performed depending on the k-bit corresponding to the ladder step, as described above. For the sake of concreteness, it is assumed that the point R is to be doubled. Accordingly, during the ladder step computation 120 the processing device is to generate the output that includes Q+R=($x_3$, $y_3$) (object 130) and 2R=($x_4$, $y_4$) (object 132). For example, in some implementations, the processing device can first obtain the output coordinates $x_3$ and $x_4$ and then determine (if needed) the coordinates $y_3$ and $y_4$. In principle, knowledge of the x-coordinates of the base point $x_0$ and the first input $x_1$ supplemented with values a and b is sufficient to determine all the x-coordinates of each and every point in the step. However, such calculation entails performing division operations, such as determining the slope $m=(x_1-x_0)/(y_1-y_0)$, which are computationally expensive. Various techniques may be used to lessen the computational burden by replacing divisions with multiplications. For example, in some implementations, the slope m may be tracked as a separate value. Similarly, the affine coordinates may be rescaled using Jacobian factors, as described in more detail below.

To reduce further the number of multiplications required within each step of the ladder, the instant specification discloses a method where computations track the slope m, the difference between the working points and the base point, e.g., $x_1-x_0$ and $x_2-x_0$, the y-coordinate of the base point y, but where there is no need to track any of the coordinates $x_0$, $x_1$, $x_2$ separately. Accordingly, the input state of the ladder includes four numbers ($x_1-x_0$, $x_2-x_0$, $y_0$, m). Similarly, the output state of the ladder includes ($x_3-x_0$, $x_4-x_0$, $y_0$, m'), where m' is a slope of the line connecting the output Q+R (130) and the base point P, as depicted in FIG. 1B. The output state may be computed using:

$$x_3 - x_0 = \frac{2y_2}{x_1 - x_2}\left(\frac{2y_2}{x_1 - x_2} - 2m\right),$$

$$x_4 - x_0 = \frac{(x_1 - x_2)^2(x_2 - x_0)^2}{(2y_2)^2} - \frac{y_0(x_1 - x_2)}{y_2},$$

$$m' = \frac{2y_2}{x_1 - x_2} - \frac{(x_1 - x_2)(x_2 - x_0)}{2y_2} - m,$$

wherein the y-coordinate follows from the fact that the point $-R=(x_2, -y_2)$ lies on the line m: $-y_2=y_0+m(x_2-x_0)$.

To avoid having to perform division operations one may also use Jacobian coordinates using scaling invariance of the Weierstrass equation and its solutions. A Jacobian transformation for the input numbers Q and R entails: $X_1=Z^2(x_1-x_0)$, $X_2=Z^2(x_2-x_0)$, $Y_0=Z^3y_0$, and M=Zm. The corresponding transformation for the output numbers Q+R, 2R: $X_3=Z'^2(x_3-x_0)$, $X_4=Z'^2(x_4-x_0)$, $Y_0=Z'^3y_0$, and M'=Z'm'. Provided that the new Jacobian multiplier is chosen to satisfy $Z'=-2Y_2(X_1-X_2)Z$, wherein $-Y_2=Y_0+MX_2$, the output values become:

$$X_3=(2Y_2)^4-2M(2Y_2)^3(X_1-X_2),$$

$$X_4=X_2^2(X_1-X_2)^4-4Y_0Y_2(X_1-X_2)^3,$$

$$M'=-(2Y_2)^2+2MY_2(X_1-X_2)+(X_1-X_2)^2X_2.$$

Because the value $y_0$ is not changed during the ladder step, the new rescaled value $Y'_0=(Z'/Z)^3Y_0=-8(X_1-X_2)^3 Y_2^3 Y_0$.

In some implementations, the ladder step computation 120 may be performed by a processing device, e.g., a central processing unit (CPU), using a number of memory registers, e.g., six registers. For example, prior to the ladder step, four registers RX1, RX2, RM, and RY may store the input state of the ladder, such as $X_1$, $X_2$, M, and $Y_0$, respectively. After the ladder step, the same four registers may store the output state of the ladder: $X_3$, $X_4$, M', and $Y'_0$. The operations below illustrate one possible implementation of the ladder step computation 120. Temporary registers RT1 and RT2 may store some intermediate results of the computation. Operations listed in Table 3 are identified by a respective operation ID listed in the left column. It shall be understood that while the order of operation IDs may correspond to the actual order of operations, in various implementations operations may be performed in different orders. For example, operations 1 and 2 may be interchanged, operation 6 may be performed prior (or concurrently) to any of operations 2-5, and so on. Some of the operations may be performed by more than one processing device acting in parallel or a single processing device executing multiple threads. Compared with the above equations for $X_3$, $X_4$, $Y_0'$, and M', the following rescaling of the y-components is implemented in operations of Table 3: $Y_0 \to Y_0/2$, $Y_2 \to -Y_2/2$. The last column in Table 3 identifies where the input into a corresponding operation (listed in the third column) is stored, and the second column indicates the registers where the output of the operation may be written. In other possible implementations, a different scheme of register allocation may be used. Some of the operations may be performed as a sequence of elemental operations. For example, operation 1, which computes the auxiliary number $Y_2$ used subsequently in determining the output coordinates $X_3$, $X_4$ and the output slope M' may be performed by 1) computing the product of M (loaded from register RM) and $X_2$ (loaded form RX2), 2) storing the computed value in RT1, 3) doubling the content of RT1, 4) adding the value $Y_0$ stored in RY to the current value in RT1, and 5) storing the result in RT1.

TABLE 3

Efficient Montgomery ladder multiplication
Input ladder state (RX1 ← $X_1$, RX2 ← $X_2$, RM ← M, RY ← $Y_0$)

| Operation ID | Output Register | Operation | Input Registers |
|---|---|---|---|
| 1 | RT1 | $Y_2 = Y_0 + 2 \cdot M \cdot X_2$ | RY \| RM \| RX2 |
| 2 | RX1 | $E = X_1 - X_2$ | RX1 \| RX2 |
| 3 | RT2 | $F = Y_2 \cdot E$ | RT1 \| RX1 |
| 4 | RX1 | $G = E^2$ | RX1 |
| 5 | RX2 | $X_2' = X_2 \cdot G$ | RX2 \| RX1 |
| 6 | RT2 | $H = Y_2^2$ | RT1 |
| 7 | RM | $M'' = M \cdot F$ | RM \| RT2 |
| 8 | RY | $Y_0'' = Y_0 \cdot F \cdot G$ | RY \| RT2 \| RX1 |
| 9 | RT1 | $K = H + M''$ | RT2 \| RM |
| 10 | RX1 | $L = K + M''$ | RT1 \| RM |
| 11 | RM | $M' = X_2' - K$ | RX2 \| RT1 |
| 12 | RX1 | $X_3 = H \cdot L$ | RT2 \| RX1 |
| 13 | RX2 | $X_4 = X_2'^2 + Y_0''$ | RX2 \| RY |
| 14 | RY | $Y_0' = Y_0'' \cdot H$ | RY \| RT2 |

Output ladder state (RX1 ← $X_3$, RX2 ← $X_4$, RM ← M', RY ← $Y_0'$)

In some implementations, various operations listed in Table 3 may be performed in parallel on multiple (logical or physical) processors sharing operands. For example, concurrently may be performed: operations 3 and 6 (using shared operand $Y_2$ loaded from RT1), operations 7 and 8 (using shared operand F loaded from RT2), operations 12 and 14 (using shared operand H loaded from RT2), and the like.

Specifically, operations 1-3, 6-7, 9-10, and 12 are used to compute a new value of the accumulator coordinate $X_3$; operations 1-5, 8, and 13 are used to compute a new value of the auxiliary coordinate $X_4$; operations 1-7, 9, and 11 are used to compute the new slope M'; and operations 1-4, 6, 8, and 14 are used to compute the new representation for the y-component $Y_0'$ of the base point. One of the advantages of the disclosed method is that the method only tracks the y-coordinate but does not have to track the x-coordinates ($X_0$ and $X_0'$) of the base point as only the distances to the base point $X_j - X_0$ are tracked.

In an alternative implementation, instead of tracking the coordinate $y_2$, a slope m of the line passing through the points Q and R (see FIG. 1B) may be tracked instead. Since $\overline{m} = (y_1 - y_2)/(x_1 - x_2)$, it follows that $2y_2 = (m - \overline{m})(x_1 - x_2)$, or in the Jacobian representation (upon the same rescaling $Y_2 \to -Y_2/2$ as used in Table 3): $Y_2 = (\overline{M} - M)(X_1 - X_2)$. Accordingly, in such implementations, the state of the ladder is represented by a set of four numbers, $X_1$, $X_2$, M, $\overline{M}$.

In another implementation, instead of tracking the slopes M, $\overline{M}$, the y-coordinates of the working points may be tracked instead. For example, an input into the Montgomery ladder step may include scaled coordinates of the input point Q: $X_1 = Z^2(x_1 - x_0)$, $Y_1 = 2Z^3 y_1$. The input into the ladder step may also include scaled coordinates of the input point R: $X_2 = Z^2(x_2 - x_0)$, $Y_2 = 2Z^3 y_2$. The output of the Montgomery ladder step may include scaled coordinates of the output point Q+R: $X_3 = Z'^2(x_3 - x_0)$, $Y_3 = 2Z'^3 y_3$. The output values may be computed according to:

$$X_3 = Y_1 Y_2^3,$$

$$X_4 = X_2^2(X_1 - X_2)^4 - X_2(X_1 - X_2)^2 Y_1 Y_2 + X_1(X_1 - X_2)^2 Y_2^2,$$

$$Y_3 = (X_1 Y_2 + X_2 Y_1)(X_1 - X_2)^2 Y_2^3 - Y_1 Y_2^4 (Y_1 + Y_2),$$

$$Y_4 = 2X_2^2(X_1 - X_2)^4(X_4 - X_3) - (X_2(X_1 - X_2)^2 - Y_1 Y_2)^2 Y_2^2.$$

Because the combination $G = (X_1 - X_2)^2$ is encountered in computations of multiple coordinates, in some implementations, G may be tracked together with the coordinates of the working points, for efficiency of computations, as described below.

In some implementations, the ladder step computation 120 may be performed by a processing device, e.g., a central processing unit (CPU), using a number of memory registers, e.g., six registers. For example, prior to the ladder step, five registers RX1, RX2, RG, RY1, and RY2 may store the input state of the ladder, such as $X_1$, $X_2$, G, $Y_3$, and $Y_4$, respectively. After the ladder step, the same five registers may store the output state of the ladder: $X_3$, $X_4$, G', $Y_3$, and $Y_4$. The operations below illustrate one possible implementation of the ladder step computation 120. Temporary register RT1 may store some intermediate results of the computation. Operations listed in Table 4 are identified by a respective operation ID listed in the left column. It shall be understood that while the order of operation IDs may correspond to the actual order of operations, in various implementations operations may be performed in different orders. For example, operations 1 and 2 may be interchanged, and so on. Some of the operations may be performed by more than one processing device acting in parallel or a single processing device executing multiple threads. The last column in Table 4 identifies where the input into a corresponding operation (listed in the third column) is stored, and the second column indicates the registers where the output of the operation may be written. In other possible implementations, a different scheme of register allocation may be used. Some of the operations may be performed as a sequence of elemental operations. For example, operation 11, which computes the output number $Y_3$ may be performed by 1) computing the square of J (loaded from register RY1), 2) storing the computed value in RY1, 3) subtracting the content of RY1 from X" (loaded from register RG), 4) storing the computed value in RY1, 5) multiplying the content of RY1 by H (loaded from register RY2), and 6) storing the result in RY1.

TABLE 4

Another implementation of efficient
Montgomery ladder multiplication
Input ladder state (RX1 ← $X_1$, RX2 ← $X_2$,
RG ← G, RY1 ← $Y_1$, RY2 ← $Y_2$)

| Operation ID | Output Register | Operation | Input Registers |
|---|---|---|---|
| 1 | RX1 | $X_1' = X_1 \cdot G$ | RX1 \| RG |
| 2 | RX2 | $X_2' = X_2 \cdot G$ | RX2 \| RG |
| 3 | RY1 | $L = Y_1 \cdot Y_2$ | RY1 \| RY2 |
| 4 | RY2 | $H = Y_2^2$ | RY2 |
| 5 | RG | $T_1 = X_1' \cdot H$ | RX1 \| RY2 |
| 6 | RX1 | $X_3 = H \cdot L$ | RY1 \| RY2 |
| 7 | RY1 | $J = X_2' - L$ | RX2 \| RY1 |
| 8 | RT1 | $M = J + X_2' - H$ | RY1 \| RY2 \| RX2 |
| 9 | RX1 | $X_4 = X_2' \cdot J + T_1$ | RX2 \| RY1 \| RG |
| 10 | RG | $X'' = X_4 - X_3$ | RX2 \| RX1 |
| 11 | RY1 | $Y_3 = (X'' - J^2) \cdot H$ | RG \| RY1 \| RY2 |
| 12 | RY2 | $Y_4 = M \cdot X'' + Y_3$ | RT1 \| RG \| RY1 |
| 13 | RG | $G' = X''^2$ | RG |

Output ladder state (RX1 ← $X_3$, RX2 ← $X_4$, RG ← G, RY1 ← $Y_3$, RY2 ← $Y_4$)

In some implementations, various operations listed in Table 4 may be performed in parallel on multiple (logical or physical) processors sharing operands. For example, concurrently may be performed: operations 3 and 4 (using shared operand $Y_2$ loaded from RY2), operations 9 and 11 (using shared operand J loaded from RY1), operations 12 and 14 (using shared operand X" loaded from RG), and the like.

In some implementations, the Joye Double-Add ladder may be used instead of the Montgomery ladder. In the Joye Double-Add ladder, the working point R may remain constant whereas coordinates of the working point $Q=(X_1, Y_1, Z)$ and the base point $P=(X_0, Y_0, Z)$ are tracked. The coordinates $X_0$ and $X_1$ may be coordinates relative to the coordinate of the point $X_2$ (e.g., $X_0-X_2$). The following formulas determine the output state of the Joye Double-Add ladder:

$X'_0 = (X_0 X_1^2)^2 + Y_0 X_1^3 (MX_0 - Y_0)$, $X_1' = X'_0 + Y_1 (MX_0 - Y_0)^3$, $M' = (MX_0 - Y_0)^2 - Y_1 (MX_0 - Y_0) - 2X_0 X_1$, $Y_0' = Y_0 X_1^3 (MX_0 - Y_0)^3$, $Y_1' = M' Y_1 (MX_0 - Y_0)^3 + Y_0'$.

Accordingly, five registers RX0, RX1, RY0, RY1, and RM may store the input state of the ladder, such as $X_0$, $X_1$, $Y_0$, $Y_1$, and M, respectively. After the ladder step, the same five registers may store the output state of the ladder: $X'_0$, $X_1'$, $Y_0'$, $Y_1'$, M'. A temporary register RT may store some intermediate results of the computation. Operations listed in Table 5 are identified by a respective operation ID listed in the left column. It shall be understood that while the order of operation IDs may correspond to the actual order of operations, in various implementations operations may be performed in different orders.

TABLE 5

Efficient Joye Double-Add ladder multiplication
Input ladder state (RX0 ← $X_0$, RX1 ← $X_1$,
RY0 ← $Y_0$, RY1 ← $Y_1$, RM ← M)

| Operation ID | Output Register | Operation | Input Registers |
|---|---|---|---|
| 1 | RM | $Y_2 = M \cdot X_0 - Y_0$ | RM \| RX0 \| RY0 |
| 2 | RT | $G = X_1^2$ | RX1 |
| 3 | RX0 | $X_0'' = X_0 \cdot G$ | RX0 \| RT |
| 4 | RY0 | $Y_0'' = Y_0 \cdot X_1 \cdot Y_2 \cdot G$ | RY0 \| RX1 \| RM \| RT |
| 5 | RY1 | $Y_1'' = Y_1 \cdot Y_2$ | RY1 \| RM |
| 6 | RT | $H = Y_2^2$ | RM |
| 7 | RM | $M' = H - Y_1'' - 2 \cdot X_0''$ | RT \| RY1 \| RX0 |
| 8 | RX0 | $X_0' = X_0''^2 + Y_0''$ | RX0 \| RY0 |
| 9 | RY1 | $Y_1''' = Y_1'' \cdot H$ | RY1 \| RT |
| 10 | RY0 | $Y_0' = Y_0'' \cdot H$ | RY0 \| RT |
| 11 | RX1 | $X_1' = Y_0' + Y_1'''$ | RX0 \| RY1 |
| 12 | RY1 | $Y_1' = M' \cdot Y_1''' + Y_0'$ | RM \| RY1 \| RY0 |

Output ladder state (RX0 ← $X_0'$, RX1 ← $X_1'$, RY0 ← $Y_0'$, RY1 ← $Y_1'$, RM ← M')

In some implementations, no temporary register may be used, if the product $Y_0 \cdot X_1$ is computed (and stored in RY0) prior to operation 2.

Figure 2:
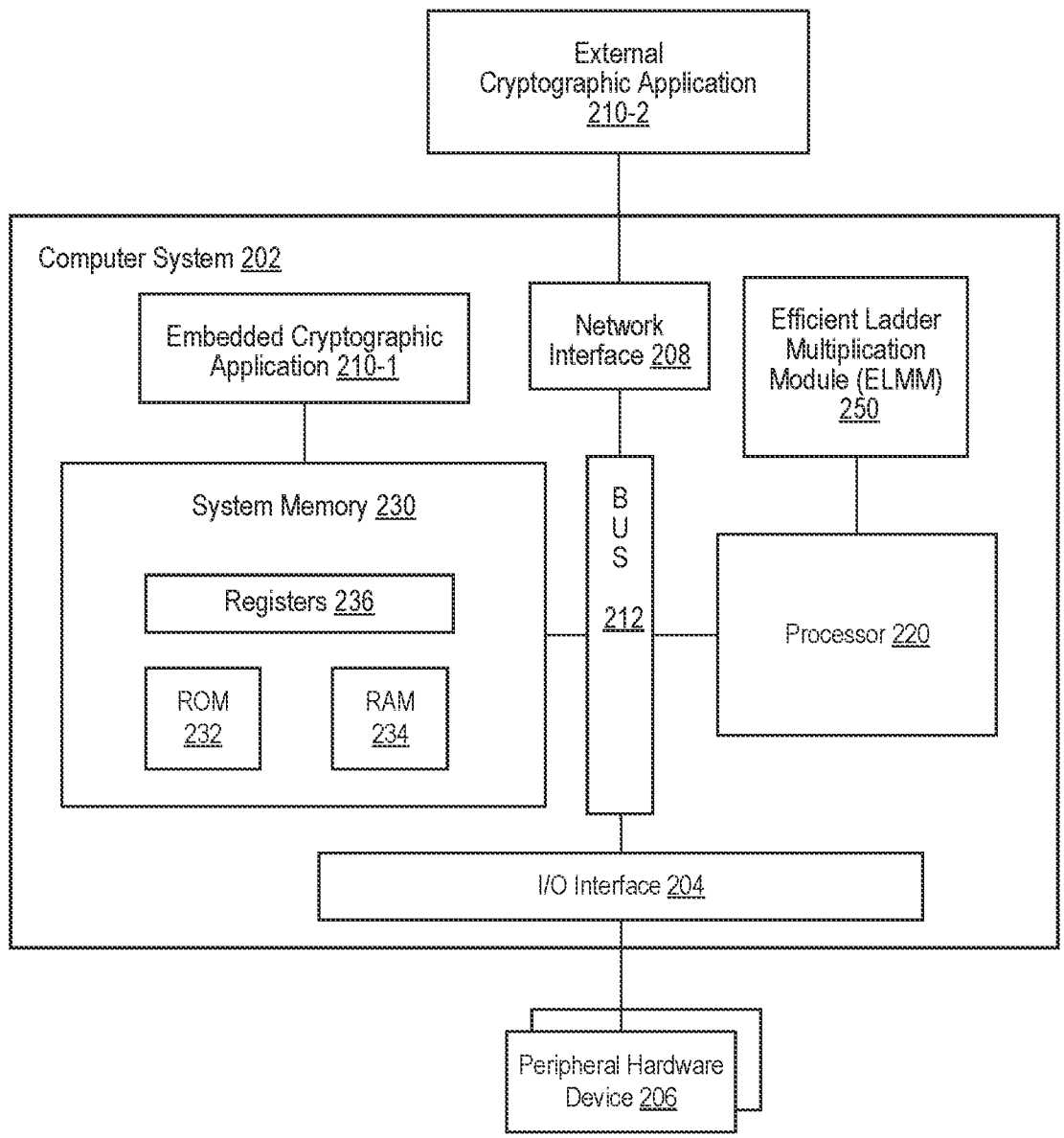
FIG. 2 is a block diagram illustrating an example system architecture in which implementations of the present disclosure may operate.

FIG. 2 is a block diagram illustrating an example system architecture 200 in which implementations of the present disclosure may operate. The example system architecture 200 may be a desktop computer, a tablet, a smartphone, a server (local or remote), a thin/lean client, and the like. The example system architecture 200 may be a smart a card reader, a wireless sensor node, an embedded system dedicated to one or more specific applications (e.g., cryptographic applications 210), and so on. The system architecture 200 may include, but not be limited to, a computer system 202 having one or more processors 220 (e.g., central processing units (CPUs)) capable of executing binary instructions, and one or more memory devices 230. "Processor" refers to a device capable of executing instructions encoding arithmetic, logical, or I/O operations. In one illustrative example, a processor may follow Von Neumann architectural model and may include an arithmetic logic unit (ALU), a control unit, and a plurality of registers.

The system architecture 200 may further include an input/output (I/O) interface 204 to facilitate connection of the computer system 202 to peripheral hardware devices 206 such as card readers, terminals, printers, scanners, internet-of-things devices, and the like. The system architecture 200 may further include a network interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from the computer system 202. Various hardware components of the computer system 202 may be connected via a bus 212 which may have its own logic circuits, e.g., a bus interface logic unit.

The computer system 202 may support one or more cryptographic applications 210, such as an embedded cryptographic application 210-1 and/or external cryptographic application 210-2. The cryptographic applications 210 may be secure authentication applications, encrypting applications, decrypting applications, secure storage applications, and so on. The external cryptographic application 210-2 may be instantiated on the same computer system 202, e.g., by an operating system executed by the processor 220 and residing in the memory device 230. Alternatively, the external cryptographic application 210-2 may be instantiated by a guest operating system supported by a virtual machine monitor (hypervisor) executed by the processor 220. In some implementations, the external cryptographic application 210-2 may reside on a remote access client device or a remote server (not shown), with the computer system 202 providing cryptographic support for the client device and/or the remote server.

The processor 220 may include one or more processor cores having access to a single or multi-level cache and one or more hardware registers. In implementations, each processor core may execute instructions to run a number of hardware threads, also known as logical processors. Various logical processors (or processor cores) may be assigned to one or more cryptographic applications 210, although more than one processor core (or a logical processor) may be assigned to a single cryptographic application for parallel processing. A multi-core processor 220 may simultaneously execute multiple instructions. A single core processor 220 may typically execute one instruction at a time (or process a single pipeline of instructions). The processor 220 may be implemented as a single integrated circuit, two or more integrated circuits, or may be a component of a multi-chip module.

The memory device 230 may refer to a volatile or non-volatile memory and may include a read-only memory (ROM) 232, a random-access memory (RAM) 234, as well as (not shown) electrically erasable programmable read-only memory (EEPROM), flash memory, flip-flop memory, or any other device capable of storing data. The RAM 134 may be a dynamic random-access memory (DRAM), synchronous DRAM (SDRAM), a static memory, such as static random-access memory (SRAM), and the like.

The memory device 230 may include one or more registers 236, such as one or more input registers 136 to store a state of the multiplication ladder (e.g., coordinates of the working points, slopes, parameters of the elliptic curve, and so on). In some implementations, the registers 236 may be implemented as part of RAM 234. In some implementations, some or all of the registers 236-142 may be implemented separately from RAM 234. Some or all of the registers 236 may be implemented as part of the hardware registers of the processor 220 (e.g., as part of the 126). In some implementations, the processor 220 and the memory device 230 may be implemented as a single field-programmable gate array (FPGA).

The computer system 202 may include an efficient ladder multiplication module (ELMM) 250 to provide instructions to the processor 220 to perform efficient ladder operations, in accordance with implementations of the present disclosure. The ELMM 150 may be implemented in software, in hardware (e.g., as part of the processor 220), in firmware, or in any combination thereof. In some implementations, the ELMM 250 may access the contents of the registers 236 functions to retrieve and store data used and generated during ladder operations.

Figure 3:
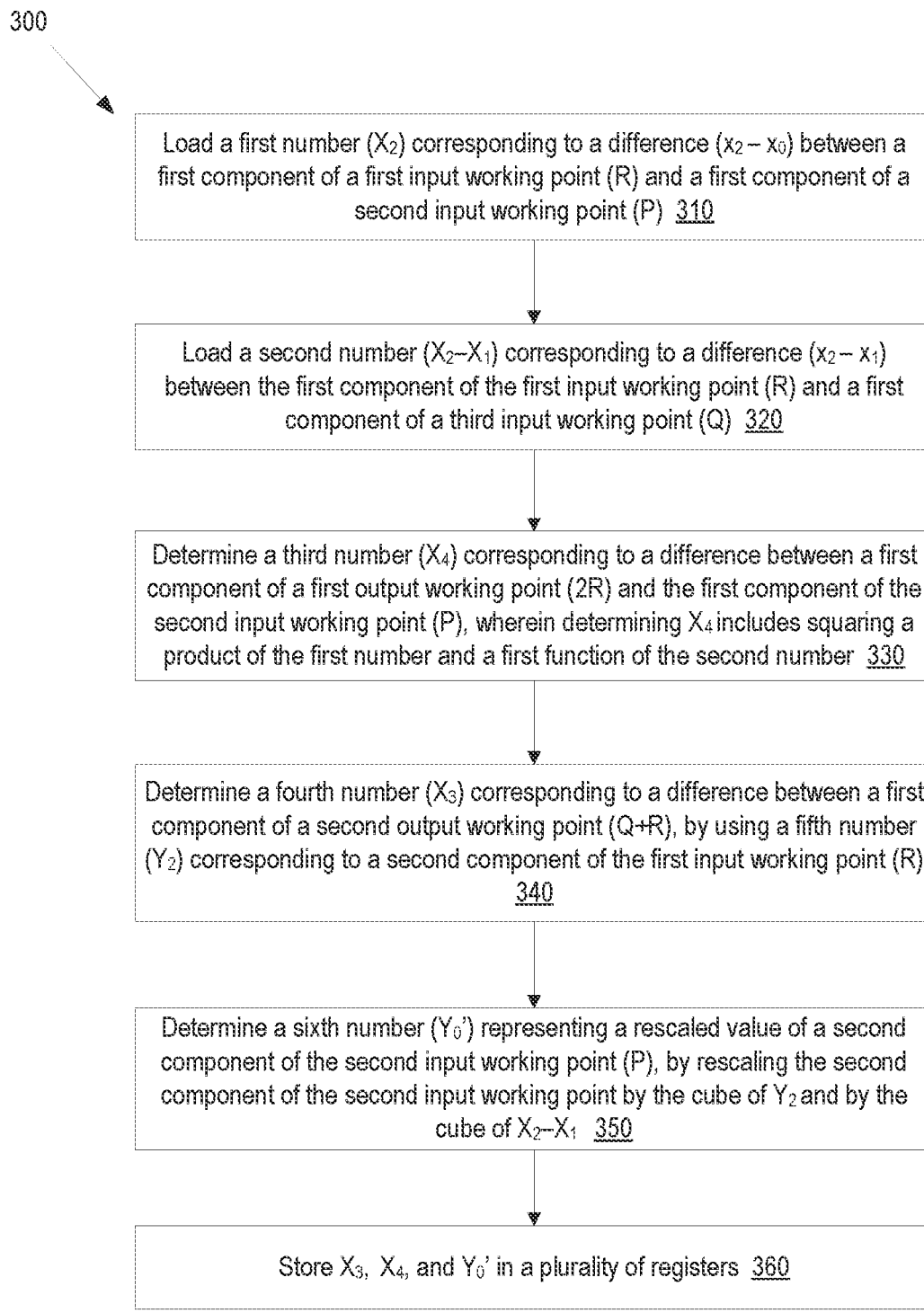
FIG. 3 depicts a flow diagram of an illustrative example of a method of performing cryptographic operations using efficient Montgomery ladder multiplication, in accordance with one or more aspects of the present disclosure.
Figure 4:
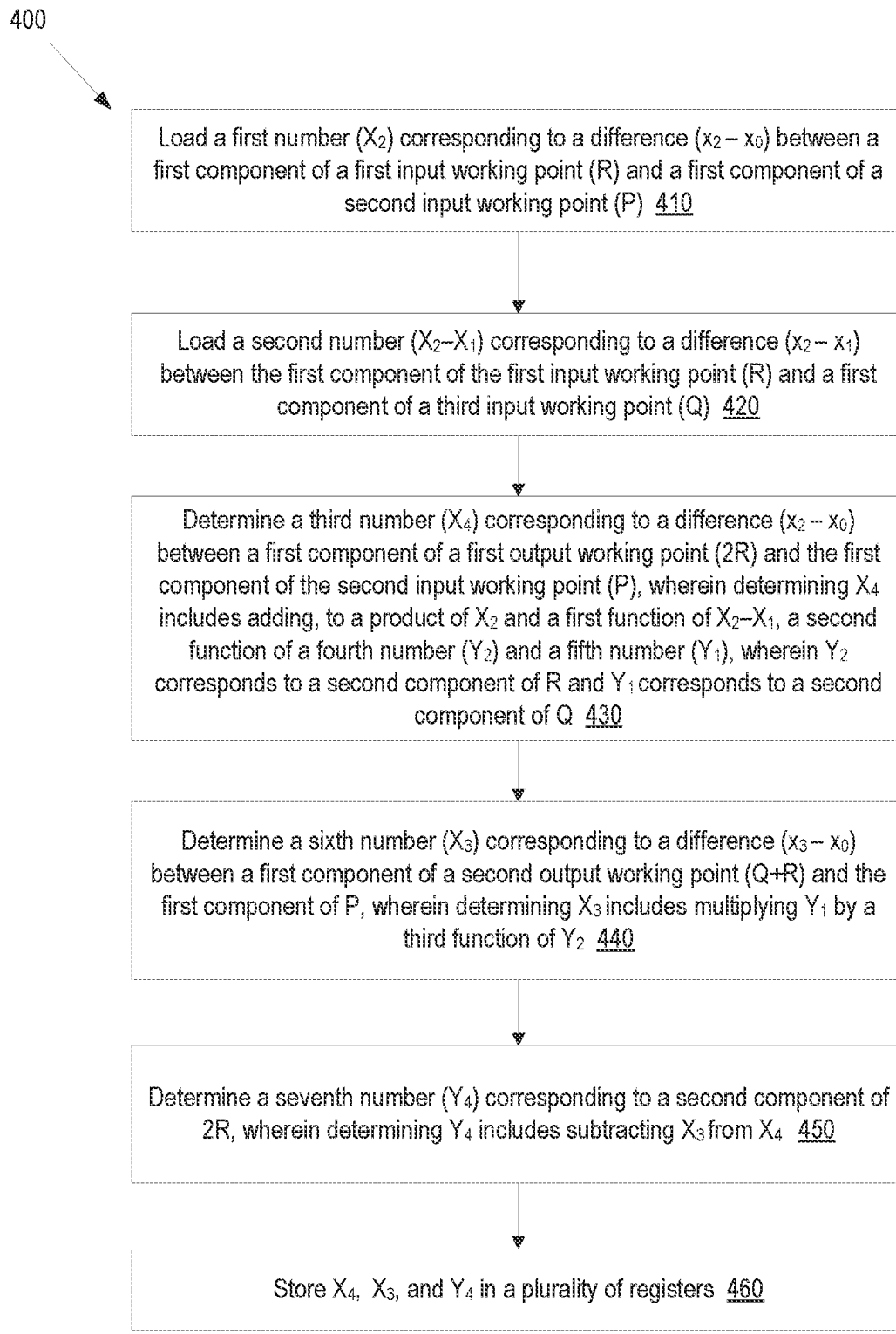
FIG. 4 depicts a flow diagram of another illustrative example of a method of performing cryptographic operations using efficient Montgomery ladder multiplication, in accordance with one or more aspects of the present disclosure
Figure 5:
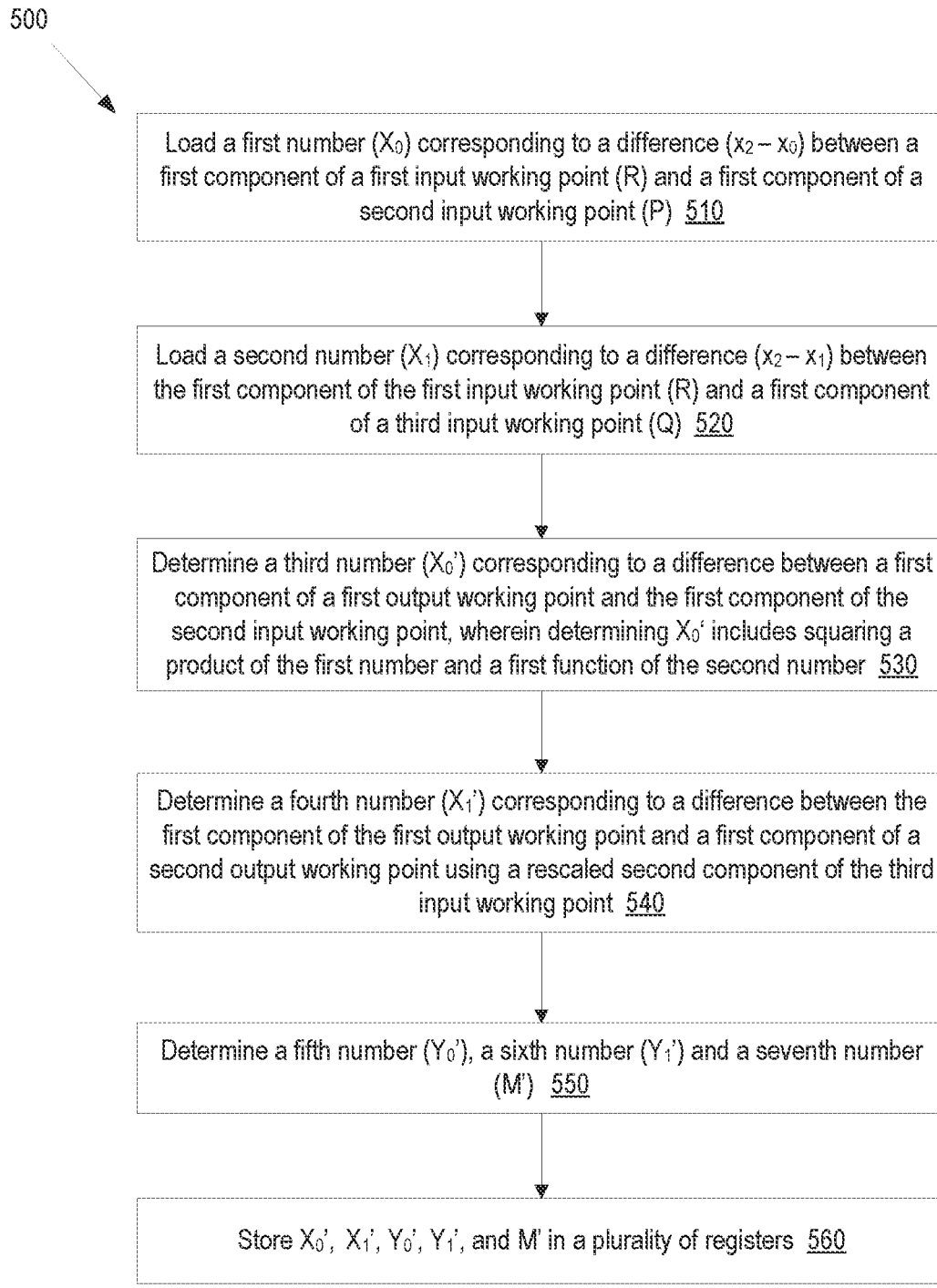
FIG. 5 depicts a flow diagram of an illustrative example of a method of performing cryptographic operations using efficient Joye Double-Add ladder multiplication, in accordance with one or more aspects of the present disclosure

FIG. 3 depicts a flow diagram of an illustrative example of method 300 of performing cryptographic operations using efficient Montgomery ladder multiplication, in accordance with one or more aspects of the present disclosure. FIG. 4 depicts a flow diagram of another illustrative example of method 400 of performing cryptographic operations using efficient Montgomery ladder multiplication, in accordance with one or more aspects of the present disclosure. FIG. 5 depicts a flow diagram of an illustrative example of method 400 of performing cryptographic operations using efficient Joye Double-Add ladder multiplication, in accordance with one or more aspects of the present disclosure. Methods 300-500 and/or each of their individual functions, routines, subroutines, or operations may be performed by one or more processing units of the computing system implementing the methods, e.g., the processor 220. In certain implementations, methods 300-500 may be performed by a single processing thread. Alternatively, methods 300-500 may be performed by two or more processing threads, each thread executing one or more individual functions, routines, subroutines, or operations of the method. In an illustrative example, the processing threads implementing methods 300-500 may be synchronized (e.g., using semaphores, critical sections, and/or other thread synchronization mechanisms). Alternatively, the processing threads implementing methods 300-500 may be executed asynchronously with respect to each other. Various blocks of methods 300-500 may be performed in a different order compared to the order shown in FIGS. 3-5. Some blocks may be performed concurrently with other blocks. Some blocks may be optional. Some or all of the block of methods 300-500 may be performed by the ELMM 250.

Methods 300-500 may be implemented by the processor 220 (or an arithmetic logic unit, an FPGA, and the like) performing a cryptographic operation, which may involve a public key number and a private key number, two private key numbers, and so on. The cryptographic operation may be a part of a larger computational operation involving multiple private key numbers and/or multiple public key numbers. The cryptographic operation may involve points in a cryptographic space. The cryptographic space may be a space of points belonging to an elliptic curve, for which rules that specify how doubling and addition operations are to be performed. A point in the cryptographic space may be identified by a plurality of coordinates. For example, a base point may be identified by coordinates that are affine coordinates $P=(x_0, y_0)$ or by projective coordinates $P=(X_0, Y_0, Z)$. Similarly, working points, e.g. Q, R, etc., at each iteration of the algorithm, may be identified by the affine coordinates $Q=(x_1, y_1)$, $R=(x_2, y_2)$ or the projective coordinates $Q=(X_1, Y_1, Z)$, $R=(X_2, Y_2, Z)$. In some implementations, e.g., where the Montgomery ladder is used, one of the working points may correspond to the accumulator of the ladder multiplication (Q) and the other working points may correspond to the auxiliary value (R=Q+P). In some implementations, the working points may swap between successive iterations of the ladder algorithm (e.g., depending on the respective bit of the cryptographic key).

At block 310, the processing device performing method 300 of efficient Montgomery ladder computations may load a first number (e.g., $X_2$) corresponding to a difference (e.g., $x_2-x_0$) between a first component (e.g., $x_2$) of a first input working point (e.g., R) on an elliptic curve and a first component (e.g., $x_0$) of a second input working point (e.g., P) on the elliptic curve. At block 320, the processing device may load a second number (e.g., $X_2-X_1$) corresponding to a difference (e.g., $x_2-x_1$) between the first component (e.g., $x_2$) of the first input working point (e.g., R) and a first component (e.g., $x_1$) of a third input working point (e.g., Q) on the elliptic curve.

At block 330, method 300 may continue with determining a third number (e.g., $X_4$) corresponding to a difference (e.g., $x_4-x_0$) between a first component (e.g., $x_4$) of a first output working point (e.g., 2R) on the elliptic curve and the first component (e.g., $x_0$) of the second input working point (e.g., P). Determining the third number may include squaring a product of the first number and a first function of the second number: $(X_2 f(X_2-X_1))^2$. In some implementations, the first function is a square, $f(X_2-X_1)=(X_2-X_1)^2$, of the second number. In some implementations, determining the third number further includes rescaling a second component (e.g., $Y_0$) of the second input working point (e.g., P) by at least a second function $g(X_2-X_1)$ of the second number. The second function may a cubic function, $g(X_2-X_1)=(X_2-X_1)^3$, of the second number. Furthermore, determining the third number may also include adding the rescaled second component of the second input working point to the squared product of the first number and the first function of the second number. The operations described in blocks 310-330 may amount to determining $X_4=X_2^2(X_1-X_2)^4+Y_0Y_2(X_1-X_2)^3$.

At block 340, method 300 may continue with determining a fourth number (e.g., $X_3$) corresponding to a difference (e.g., $x_3-x_0$) between a first component (e.g., $x_3$) of a second output working point (e.g., Q+R) on the elliptic curve and the first component (e.g., $x_0$) of the second input working point (e.g., P). Determining the fourth number may include determining a fifth number (e.g., $Y_2$) corresponding to a second component of the first input working point (e.g., R). Determining the fifth number may include using an input representation (e.g., M) of a slope of a line passing through the second input working point and the third input working point. Determining the fourth number (e.g., $X_3$) may also include computing a square of the fifth number (e.g., $Y_2^2$), and multiplying the square of the fifth number by a function of the fifth number and the second number, $X_2-X_1$. The operations of block 340 may amount to determining $X_3=Y_2^2(Y_2^2+2MY_2(X_1-X_2))$.

At block 350, method 300 may continue with determining a sixth number (e.g., $Y'_0$) representing a rescaled value of a second component of the second input working point (e.g., P), by rescaling the second component (e.g., $Y_0$) of the second input working point by the cube of the fifth number (e.g., by $Y_2^3$) and by a square of the second number (e.g., by $(X_2-X_1)^2$). The operations of block 350 may amount to determining $Y'_0=(X_1-X_2)^3 Y_2^2 Y_0$.

At block 360, method 300 may continue with storing the third number (e.g., $X_4$) in a first register, storing the fourth number (e.g., $X_3$) in a second register, and storing the sixth number (e.g., $Y_0$) in a third register. Similarly, the method 300 may include determining an output representation (e.g., M') of a slope of a line passing through the second input working point (e.g., P) and the second output working point (e.g., Q+R) and storing the determined output representation in a fourth register. The first register, the second register, the third register, and the fourth register may be input registers for a subsequent iteration of the plurality of iterations.

With reference to FIG. 4, illustrate an efficient Montgomery ladder computations of Table 4, at block 410, the processing device performing method 400 may load a first number (e.g., $X_2$) corresponding to a difference (e.g., $x_2-x_0$) between a first component (e.g., $x_2$) of a first input working point (e.g., R) on an elliptic curve and a first component (e.g., $x_0$) of a second input working point (e.g., P) on the elliptic curve. At block 420, the processing device may load a second number (e.g., $X_2-X_1$) corresponding to a difference (e.g., $x_2-x_1$) between the first component (e.g., $x_2$) of the first input working point (e.g., R) and a first component (e.g., $x_1$) of a third input working point (e.g., Q) on the elliptic curve.

At block 430, method 400 may continue with determining a third number (e.g., $X_4$) corresponding to a difference (e.g., $x_4-x_0$) between a first component (e.g., $x_4$) of a first output working point (e.g., 2R) on the elliptic curve and the first component (e.g., $x_0$) of the second input working point (e.g., P). Determining the third number may include adding, to a product of the first number (e.g., $X_2$) and a first function of the second number (e.g., $X_2-X_1$), a second function of a fourth number (e.g., $Y_2$) and a fifth number (e.g., $Y_1$): $X_2 \cdot f_1(X_2-X_1)+f_2(Y_1, Y_2)$). The fourth number (e.g., $Y_2$) may correspond to a second component of the first input working point (e.g., R) on the elliptic curve and the fifth number (e.g., $Y_1$) may correspond to a second component of the second input working point (e.g., R) on the elliptic curve. In some implementations, the first function is a square, $f_1(X_2-X_1)=(X_2-X_1)^2$, of the second number. In some implementations, the second function is a negative product, $f_2(Y_1, Y_2)=-Y_1Y_2$, of the fourth number (e.g., $Y_2$) and the fifth number (e.g., $Y_1$). In some implementations, determining the third number (e.g., $X_4$) may include additional operations, e.g., as described in Table 4.

At block 440, method 400 may continue with determining a sixth number (e.g., $X_3$) corresponding to a difference (e.g., $x_3-x_0$) between a first component (e.g., $x_3$) of a second output working point (e.g., Q+R) on the elliptic curve and the first component (e.g., $x_0$) of the second input working point (e.g., P). Determining the sixth number (e.g., $X_3$) may include multiplying the fifth number (e.g., $Y_1$) by a third function, (e.g., $f_3(Y_2)$) of the fourth number (e.g., $Y_2$). In some implementations, the third function of the fourth number may be a cubic function of the fourth number, $f_3(Y_2)=Y_2^3$. The operations of block 440 may amount to computing $X_3=Y_1 Y_2^3$.

At block 450, method 400 may continue with determining a seventh number (e.g., $Y_4$) corresponding to a second component of the first output working point (e.g., 2R) on the elliptic curve. In some implementations, determining the seventh number (e.g., $Y_4$) includes subtracting the sixth number (e.g., $X_3$) from the third number (e.g., $X_4$) to compute the combination $X_4- X_3$. The operations of block 450 may include additional operations to determine the seventh number, e.g., as described in Table 4. Operations of method 400 may further include computations to determine a number (e.g., $Y_3$) corresponding to a second component of the second output working point (e.g., Q+R) on the elliptic curve.

At block 460, method 400 may continue with storing the third number (e.g., $X_4$) in a first register, storing the sixth number (e.g., $X_3$) in a second register, and storing the seventh number (e.g., $Y_4$) in a third register. Similarly, method 400 may include storing the number (e.g., $Y_3$) corresponding to the second component of the second output working point (e.g., Q+R) in a fourth register. The first register, the second register, the third register, and the fourth register may be input registers for a subsequent iteration of the plurality of iterations. A fifth register may store an auxiliary number $(X_2- X_1)^2$.

With reference to FIG. 5, at block 510, the processing device performing method 500 of efficient Joye Double-Add ladder computations may load a first number (e.g., $X_0$) corresponding to a difference (e.g., $x_2-x_0$) between a first component (e.g., $x_2$) of a first input working point (e.g., R) on an elliptic curve and a first component (e.g., $x_0$) of a second input working point (e.g., P) on the elliptic curve. At block 520, the processing device may load a second number (e.g., $X_1$) corresponding to a difference (e.g., $x_2-x_1$) between the first component (e.g., $x_2$) of the first input working point (e.g., R) and a first component (e.g., $x_1$) of a third input working point (e.g., Q) on the elliptic curve.

At block 530, method 500 may continue with determining a third number (e.g., $X_0'$) corresponding to a difference (e.g., $x'_2-x_0$) between a first component (e.g., $x_2'$) of a first output working point on the elliptic curve and the first component (e.g., $x_0$) of the second input working point (e.g., P). Determining the third number (e.g., $X_0'$) may include squaring a product of the first number (e.g., $X_0$) and a function $h(X_1)$ of the second number. In some implementations, the function of the second number is a square of the second number, $h(X_1)=X_1^2$. The operations described in blocks 510-530 may amount to determining $X'_0=(X_0X_1^2)^2+Y_0X_1^3(MX_0-Y_0)$.

At block 540, method 500 may continue with determining the fourth number (e.g., $X_1'$) corresponding to a difference (e.g., $x_2'-x_1'$) between the first component (e.g., $x_2'$) of the first output working point on the elliptic curve and a first component (e.g., $x_1'$) of a second output working point. Determining the fourth number may include adding, to the third number (e.g., $X_0'$), a rescaled second component (e.g., $Y_1$) of the third input working point (e.g., rescaled by $X_1^3(MX_0-Y_0)$). The operations of block 530 may amount to determining $X_1'=X_0X_1^2+Y_0X_1^2(MX_0-Y_0)+Y_1(MX_0-Y_0)^3$.

At block 550, method 500 may continue with determining a fifth number (e.g., $Y'_0$) representing a second component of the first output working point, determining a sixth number (e.g., $Y_1'$) representing a second component of the second output working point, and determining a seventh number (e.g., M') representing a slope of a line passing through the second input working point and the second output working point. At block 560, method 500 may continue with storing the third number (e.g., $X_0'$) in a first register, storing the fourth number (e.g., $X_1'$) in a second register, storing the fifth number (e.g., $Y'_0$) in a third register, storing the sixth number (e.g., $Y_1'$) in a fourth register, and storing the seventh number (e.g., M') in a fifth register. The first register, the second register, the third register, the fourth register, and the fifth register may be input registers for a subsequent iteration of the plurality of iterations.

Any arithmetic operation described in reference to FIGS. 1, 3, 4 and 5 may be a modular arithmetic operation.

Montgomery and Joye ladders on elliptic curves compute a product of two numbers, e.g., k*G, on the curve using a state of the form (P, Q, R), where at every step P+Q+R=0, with 0 representing the neutral point. The ladder operations include operations that permute the state of the ladder and then compute the ladder step (P, Q, R)→(P, Q-R, 2R).

The points (P, Q, R) may be elliptic curve points, which may have a projective representation, meaning that the coordinates are of the form X/Z (or some other power of Z) instead of X. In some implementations, the ladder step is well-defined for all such points except for the neutral point, which is located at infinity, so its representation involves Z=0. If such a situation is encountered, in some implementations, the rest of the ladder state may involve an indeterminate operation 0/0.

There are three commonly used forms of elliptic curve. Montgomery and Edwards curves have an even number of points (the number may be divisible by 4). The typical ladder operations on such curves do not suffer from the neutral point problem and are well-defined for all inputs.

Another common form of a curve is the short Weierstrass curve. Such curves are usually chosen of a prime order. Ladder operations on such curves may suffer from the neutral point problem. Nonetheless, if a chosen curve has a prime order, the neutral point problem may arise with a negligible probability and, generally, are not exploitable.

Existing approaches to avoiding the neutral point problem for short Weierstrass curves use formulas that remain correct even when the point at infinity is encountered, but implementing such formulas usually comes with a significant performance penalty.

Aspects and implementations of this disclosure address these shortcomings by describing a method to handle the point at infinity on the short Weierstrass curves. The disclosed method may be of particular benefit if the curve's order is not prime (but also is not divisible by 2, 3, or 5). Additionally, the disclosed method may be advantageous in more general implementations, to ensure that the ladder operations are well-defined for all inputs.

Namely, to address the neutral point problem, a condition may be detected that the ladder state is about to reach the neutral point. Responsive to the detection of such condition, the ladder operations may be modified and routed through a shadow ladder state that results in the same outcome of the ladder step.

Specifically, if the curve's order is odd, the neutral point can only be reached from states which are proportional to (−2, 1, 1), which ladders to (−2, 0, 2). Applying the ladder operation to this state gives an exit state (−2, −2, 4), which no longer contains 0. Alternatively, rearranging it and laddering can give the same state, or the doubled state (−4, 0, 4).

A method may be used to permute (−2, 1, 1) to (1, −2, 1) so that the ladder operation brings it to the shadow state (1, −3, 2). Laddering this as (2, −3, 1) gives (2, −4, 2), which may be negated (a computationally cheap operation) to obtain the desired exit state. Laddering it as (−3, 2, 1) gives the equivalent state (−3, 1, 2). Laddering it as (2, 1, −3) gives the doubled state (−3, 4, −6). Therefore, no matter which way the problematic state (−2, 0, 2) is evolved, it can be shadowed using the same number of operations on the shadow state.

If the ladder operation ends while in the neutral state, the output (proportional to 2 or −2) may instead be extracted from the shadow state, which contains 2. The described method avoids the neutral point if the curve's order is odd and not divisible by 3.

Figure 6:
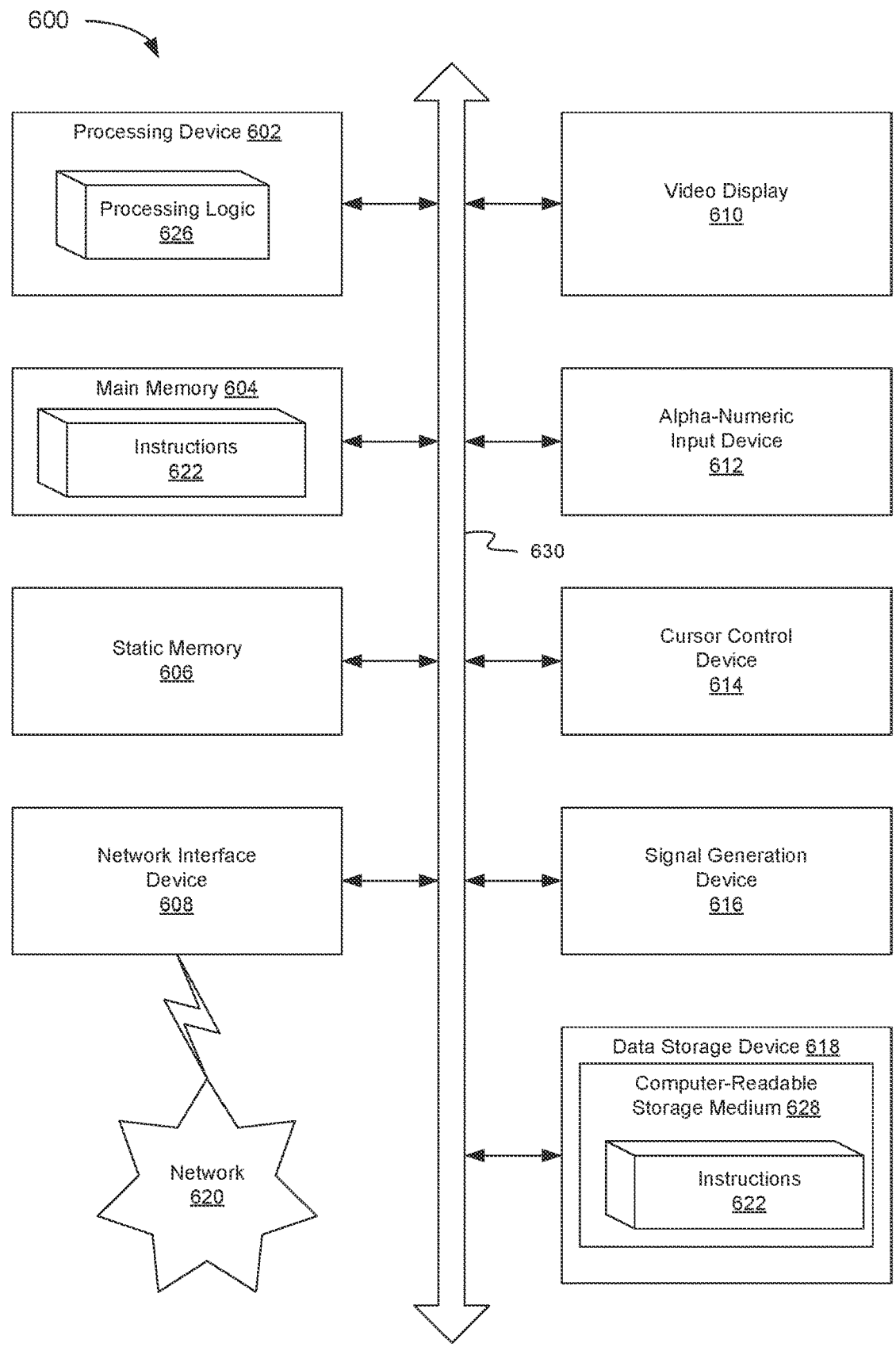
FIG. 6 depicts a block diagram of an example computer system operating in accordance with one or more aspects of the present disclosure.

FIG. 6 depicts a block diagram of an example computer system 600 operating in accordance with one or more aspects of the present disclosure. In various illustrative examples, computer system 600 may represent the processing device 100, illustrated in FIG. 1.

Example computer system 600 may be connected to other computer systems in a LAN, an intranet, an extranet, and/or the Internet. Computer system 600 may operate in the capacity of a server in a client-server network environment. Computer system 600 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 600 may include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which may communicate with each other via a bus 630.

Processing device 602 represents one or more general-purpose processing devices such as a microprocessor, central processing unit, or the like. More particularly, processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 602 may be configured to execute instructions implementing methods 300 and 400 of performing cryptographic operations using efficient Montgomery ladder multiplication and method 500 of performing cryptographic operations using efficient Joye Double-Add ladder multiplication.

Example computer system 600 may further comprise a network interface device 608, which may be communicatively coupled to a network 620. Example computer system 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 may include a computer-readable storage medium (or, more specifically, a non-transitory computer-readable storage medium) 628 on which is stored one or more sets of executable instructions 622. In accordance with one or more aspects of the present disclosure, executable instructions 622 may comprise executable instructions implementing method 400 of protecting cryptographic operations by intermediate randomization.

Executable instructions 622 may also reside, completely or at least partially, within main memory 604 and/or within processing device 602 during execution thereof by example computer system 600, main memory 604 and processing device 602 also constituting computer-readable storage media. Executable instructions 622 may further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to perform a cryptographic operation, the method comprising:
    performing, by a processing device, a plurality of iterations, wherein each of the plurality of iterations comprises:
    loading a first number corresponding to a difference between a first component of a first input working point on an elliptic curve and a first component of a second input working point on the elliptic curve;
    loading a second number corresponding to a difference between the first component of the first input working point and a first component of a third input working point on the elliptic curve; and
    determining a third number corresponding to a difference between a first component of a first output working point on the elliptic curve and the first component of the second input working point, wherein determining the third number comprises squaring a product of the first number and a first function of the second number.

2. The method of claim 1, wherein the first function of the second number is a square of the second number.

3. The method of claim 1, wherein determining the third number further comprises:
    rescaling a second component of the second input working point by at least a second function of the second number; and
    adding the rescaled second component of the second input working point to the squared product of the first number and the first function of the second number.

4. The method of claim 3, wherein the second function is a cubic function of the second number.

5. The method of claim 1, further comprising:
    determining a fourth number corresponding to a difference between a first component of a second output working point on the elliptic curve and the first component of the second input working point, wherein determining the fourth number comprises:
    determining a fifth number corresponding to a second component of the first input working point;
    computing a square of the fifth number; and
    multiplying the square of the fifth number by a function of the fifth number and the second number.

6. The method of claim 5, wherein determining the fifth number comprises using an input representation of a slope of a line passing through the second input working point and the third input working point.

7. The method of claim 6, further comprising:
    determining a sixth number representing a rescaled value of a second component of the second input working point, by rescaling the second component of the second input working point by a cube of the fifth number and by a cube of the second number.

8. The method of claim 7, further comprising:
    storing the third number in a first register;
    storing the fourth number in a second register; and
    storing the sixth number in a third register, wherein the first register, the second register, and the third register are input registers for a subsequent iteration of the plurality of iterations.

9. The method of claim 6, further comprising:
    determining an output representation of a slope of a line passing through the second input working point and the second output working point; and
    storing the determined output representation in a register.

10. The method of claim 1, wherein, the first number is loaded from 1) a first register, if a cryptographic key bit corresponding to a respective iteration of the plurality of iterations has a first bit value, or 2) a second register, if the cryptographic key bit has a second bit value.

11. The method of claim 1, wherein the cryptographic operation is a multiplication operation to multiply a base point by a cryptographic key, and wherein the first input working point and the second input working point are selected based on a value of a cryptographic key bit corresponding to a respective iteration of the plurality of iterations.

12. The method of claim 1, further comprising:
    determining a fourth number corresponding to a difference between the first component of the first output working point on the elliptic curve and a first component of a second output working point, wherein determining the fourth number comprises adding, to the third number, a rescaled second component of the third input working point.

13. The method of claim 12, wherein the rescaled second component of the third input working point is determined by multiplying the second component of the third input working point by a second function of a combination comprising the first number, a second component of the second input working point, and a representation of a slope of a line passing through the second input working point and the third input working point.

14. The method of claim 13, wherein the second function is a cubic function of the combination.

15. A system to perform a cryptographic operation, the system comprising:
   a memory device; and
   a processing device coupled to the memory device to perform a plurality of iterations, wherein each of the plurality of iterations comprises:
      loading a first number corresponding to a difference between a first component of a first input working point on an elliptic curve and a first component of a second input working point on the elliptic curve;
      loading a second number corresponding to a difference between the first component of the first input working point and a first component of a third input working point on the elliptic curve; and
      determining a third number corresponding to a difference between a first component of a first output working point on the elliptic curve and the first component of the second input working point, wherein to determine the third number the processing device is to square a product of the first number and a first function of the second number.

16. The system of claim 15, wherein the first function is a square of the second number.

17. The system of claim 15, wherein each of the plurality of iterations further comprises:
   rescaling a second component of the second input working point by at least a second function of the second number; and
   adding the rescaled second component of the second input working point to the squared product of the first number and the first function of the second number.

18. A non-transitory computer-readable medium storing instructions thereon, wherein the instructions, when executed by a processing device performing a cryptographic operation, cause the processing device to perform a plurality of iterations, wherein each of the plurality of iterations comprises:
   loading a first number corresponding to a difference between a first component of a first input working point on an elliptic curve and a first component of a second input working point on the elliptic curve;
   loading a second number corresponding to a difference between the first component of the first input working point and a first component of a third input working point on the elliptic curve; and
   determining a third number corresponding to a difference between a first component of a first output working point on the elliptic curve and the first component of the second input working point, wherein determining the third number comprises squaring a product of the first number and a first function of the second number.

19. The non-transitory computer-readable medium of claim 18, wherein the first function is a square of the second number.

20. The non-transitory computer-readable medium of claim 18, wherein each of the plurality of iterations further comprises:
   rescaling a second component of the second input working point by at least a second function of the second number; and
   adding the rescaled second component of the second input working point to the squared product of the first number and the first function of the second number.

21. A method to perform a cryptographic operation, the method comprising:
   performing, by a processing device, a plurality of iterations, wherein each of the plurality of iterations comprises:
      loading a first number corresponding to a difference between a first component of a first input working point on an elliptic curve and a first component of a second input working point on the elliptic curve;
      loading a second number corresponding to a difference between the first component of the first input working point and a first component of a third input working point on the elliptic curve; and
      determining a third number corresponding to a difference between a first component of a first output working point on the elliptic curve and the first component of the second input working point, wherein determining the third number comprises adding, to a product of the first number and a first function of the second number, a second function of a fourth number and a fifth number, wherein the fourth number corresponds to a second component of the first input working point on the elliptic curve and the fifth number corresponds to a second component of the second input working point on the elliptic curve.

22. The method of claim 21, wherein the first function of the second number is a square of the second number.

23. The method of claim 21, wherein the second function is a negative product of the fourth number and the fifth number.

24. The method of claim 21, further comprising:
   determining a sixth number corresponding to a difference between a first component of a second output working point on the elliptic curve and the first component of the second input working point, wherein determining the sixth number comprises multiplying the fifth number by a third function of the fourth number.

25. The method of claim 24, wherein the third function of the fourth number is a cubic function of the fourth number.

26. The method of claim 24, further comprising:
   determining a seventh number corresponding to a second component of the first output working point on the elliptic curve, wherein determining the seventh number comprises subtracting the sixth number from the third number.

* * * * *